United States Patent [19]

Zweifel

[11] Patent Number: 4,722,670

[45] Date of Patent: * Feb. 2, 1988

[54] AQUARIUM PUMP AND CLEANING SYSTEM

[76] Inventor: Michael R. Zweifel, 2901 N. Jefferson, Enid, Okla. 73701

[*] Notice: The portion of the term of this patent subsequent to Oct. 2, 2003 has been disclaimed.

[21] Appl. No.: 506,003

[22] Filed: Jun. 20, 1983

[51] Int. Cl.[4] .............................................. F04F 5/44
[52] U.S. Cl. .................................. 417/181; 417/198; 15/1.7; 210/169
[58] Field of Search ............... 417/181, 187, 151, 163, 417/167, 188, 189, 198; 15/1.7; 210/169

[56] References Cited

U.S. PATENT DOCUMENTS

| | | | |
|---|---|---|---|
| 134,710 | 1/1873 | Stedman | 239/515 |
| 881,548 | 3/1908 | Claflin | 417/181 |
| 905,818 | 12/1908 | Langford | 417/181 |
| 1,067,653 | 7/1913 | Hearing | 417/187 |
| 1,137,767 | 5/1915 | Leblanc | 417/174 X |
| 1,950,172 | 3/1934 | Gavaza | 417/181 |
| 1,982,128 | 11/1934 | Vetrano | 417/198 |
| 2,112,290 | 3/1938 | Holland | 417/181 |
| 3,225,930 | 12/1965 | Willinger | 15/1.7 X |
| 3,304,564 | 2/1967 | Green et al. | 210/169 X |
| 3,785,572 | 1/1974 | Arnold et al. | 239/518 |
| 3,826,371 | 7/1974 | Adamson | 15/1.7 X |
| 3,838,002 | 9/1974 | Glunz et al. | 417/151 X |

Primary Examiner—Edward K. Look
Attorney, Agent, or Firm—Hiram A. Sturges

[57] ABSTRACT

The fish tank cleaning system of this invention comprises a water pump using power of water flowing at a sink to pull by venturi principle water through a hose from an aquarium to empty the aquarium or to cooperate with tools used at the aquarium for cleaning the stones on the bottom thereof and for cleaning the walls thereof, the stone-cleaning tool comprising a housing from which water is pulled, the lower end of the housing being adapted to engage rocks on the aquarium bottom, the housing having rock-stirring means mounted thereon, the wall-cleaning being done with a squeegee having a special water and debris suction opening for delivering water to a hose.

2 Claims, 8 Drawing Figures

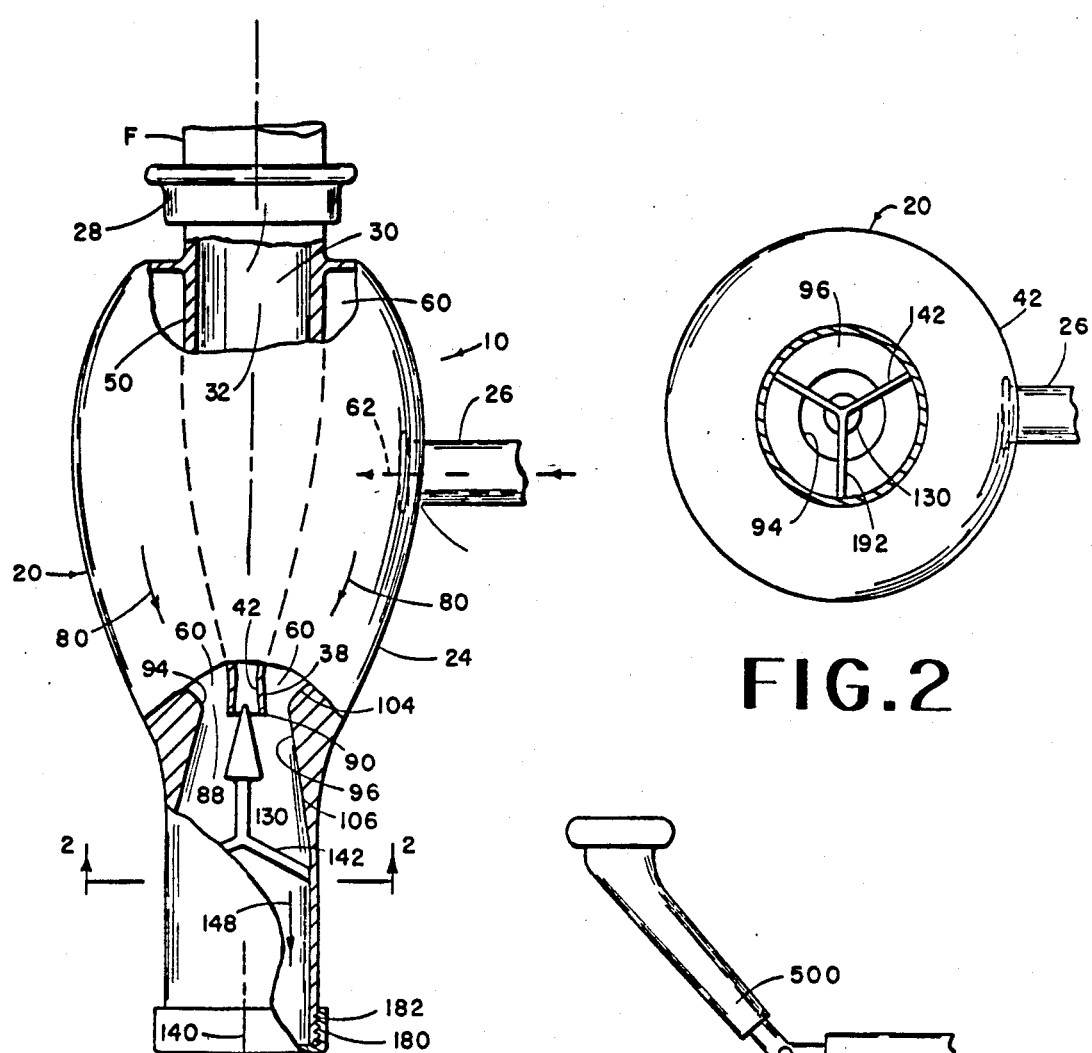
FIG. 2
FIG. 3
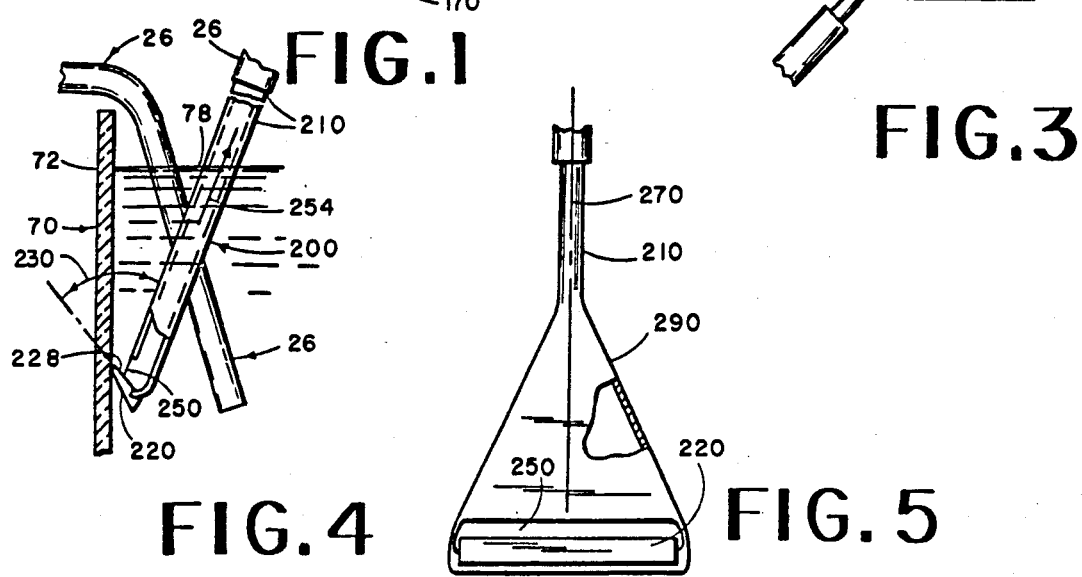
FIG. 1
FIG. 4
FIG. 5

AQUARIUM PUMP AND CLEANING SYSTEM

BACKGROUND OF THE INVENTION

This invention is in the field of cleaning systems for aquarium tanks. Such tanks have been laboriously cleaned by dipping buckets into the tank and carrying buckets of used water to a sink to be dumped. The filling of such tanks has been done by the laborious carrying of buckets of water to the tank, one by one.

There have been proposals in the prior art for cleaning aquarium tanks by use of a hose stretching from the aquarium to the sink and by use of a pump.

However, such proposals have involved the expense of an electric pump for water, or an electric pump for air used to power the removal of water from the aquarium. It is my concept that it is more economical to use the power of water coming from a water faucet at a sink. In addition, the use of water power is with greater safety because there is less danger of electric shock when handling water around electric current, as in the prior art proposals.

Economy is also very important. It is my opinion that the reason the earlier proposals are not seen on the market, in my experience, is because they are quite expensive.

A problem arises in the use of water power from a tap because of the great vertical distance needed to make an effective venturi pump, if such a pump is made in accordance with the venturi pumps of the prior art used in other fields. Accordingly, it is an object of this invention to provide a venturi pump which has special principles making it possible for the pump to be contained between a normal faucet level and the bottom of a sink, so that the average home can use such a device.

A further object of this invention is to provide a rock-stirring device for stirring the rocks on the bottom of an aquarium to cause the debris to raise therefrom so as to be drawn off by suction through a hose, the suction being applied to a small area for effective results and the area being bounded by the housing of the rock-stirring device, which latter has a stirring rod mounted in it.

Still another objective is to provide a squeegee especially adapted to work on the vertical walls of an aquarium, the squeegee having a resilient blade, such as a rubber blade, and there being an inlet for catching the debris-laden water as it is removed from the aquarium wall and for delivering it through a hose to a sink.

Heretofore, the only tools available for cleaning the sidewalls of an aquarium have been brushes or razor blades or resilient squeegee blades disposed in a pushing position for being pushed over a surface rather than in a pulling position for being pulled over a surface, which latter is much more effective on the sidewalls of an aquarium, the only pushing squeegee blades, however, in the prior art being for swimming pools not for aquariums.

SUMMARY OF THE INVENTION

A major goal of this invention is to provide an aquarium cleaning system comprising a water pump pulling water through a hose, a stone-cleaning tool for cleaning the stones on the bottom of an aquarium and comprising a housing to which the hose is connected, the housing having an open bottom for engaging rocks and having a rock-stirring rod extended therethrough so that an operator can manipulate the outer end of the rod for stirring the rocks to cause debris to rise therefrom into the water being pulled through the hose.

Another goal of this invention is to provide a squeegee having an elongated resilient blade extending transversely to an elongated tubular handle, the handle having an opening adjacent to the blade for catching debris-laden water adjacent the blade and delivering it through the hose connected to the other end of the tubular handle of the squeegee tool.

Yet a further goal is to provide a special venturi pump having spaced inner and outer housings tapering from larger upper ends to lower ends that are more constricted, the pump having a flow divider having a smaller upper end tapering to a larger lower end with the upper end of the flow divider disposed adjacent the center of an outlet at the lower end of the inner chamber of the pump, the pump having a constriction on the inner side of its outer wall which surrounds the lower end of the inner chamber and the inner wall of the outer chamber tapering outwardly again gradually to a larger lower end, which latter has an outlet for disposal of water into a sink, the outlet being cappable with a cap so as to use the outer housing as an enclosure so that water coming from an inlet to the inner chamber is caused to flow outwardly through a hose in the outer housing for delivering fresh water to an aquarium.

BRIEF DESCRIPTION OF THE DRAWINGS

FIG. 1 is a side elevation of a venturi pump of this invention with upper and lower portions of the housing wall broken away to show the interior in cross-section. A cap for the lower end of the pump is shown in place, as it would be if it is intended to deliver water from the pump through a hose to an aquarium. The cap is removed when pumping from the aquarium is desired.

FIG. 2 is a bottom plan view of the pump of FIG. 1.

FIG. 3 shows a flow divider to be slipped over a faucet for delivering water to two aquariums at once.

FIG. 4 is a side elevation of a squeegee tool in position of use and shown engaging the side of an aquarium, which latter is shown in cross-section, the tool having a portion of its side wall broken away to show its hollow interior. FIG. 4 also shows an example of the position of a hose in an aquarium at a time when the aquarium is either being emptied or filled.

FIG. 5 is a view of the squeegee tool of FIG. 4 as it would be seen looking at its left side at a right angle to its handle.

DESCRIPTION OF THE PREFERRED EMBODIMENT

Figure 6:
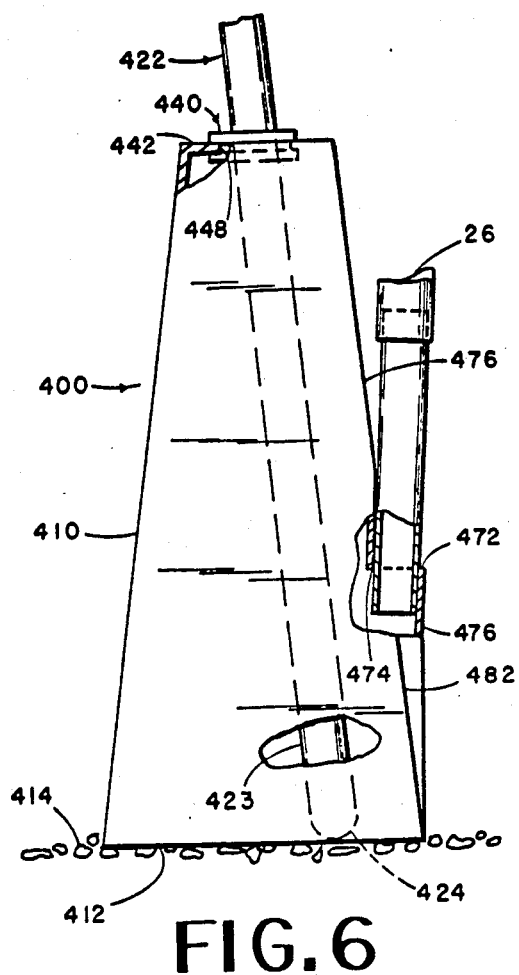
FIG. 6 is a side elevation of the aquarium bottom cleaning tool of this invention showing rocks on the bottom being stirred by the tool, portions of the side wall of the tool being broken away.
Figure 7:
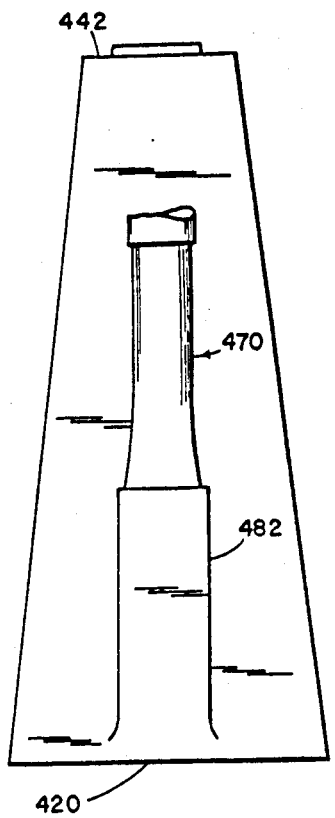
FIG. 7 is a side elevation of the tool of FIG. 6 as seen from the right side, but without the rod showing.

The aquarium servicing system of this invention is generally indicated at 10 in FIG. 1, and comprises a pump as one of its parts, generally indicated at 20, which latter has an outer housing 24, to which a hose 26 of about one-half inch diameter is connected. The outer housing 24 has a coupling 28 attached to it of a type for reception on the faucet of a sink, whereby water from the faucet passes down into the interior of a constricted chamber 30, which has a constricted lower end and an enlarged upper end, the upper end 32 being adapted to receive the terminal end of a faucet therein, so that water from the faucet flows downwardly through the chamber 30 from an inlet port 33.

Since the chamber 30 is of gradually lesser and lesser area as its lower end is approached until a place of maximum constriction 38 is reached the water will, therefore, jet out from the lower end of the chamber 30 with considerable force.

The lower end of the chamber 30 has an inner wall 42 which is of the least horizontal cross sectional area at a point and then once against the area defined by the wall 42 becomes slightly larger in the last approximately one quarter inch or more of the length of the chamber 10.

The hose 26 connects to an inlet opening 43.

The chamber 30 has a wall 50 of which 42 defines the inner surface thereof, or, in other words, the inner surface of the chamber 30.

Between the wall 50 and the outer housing 24 a flow area 60 into which the hose 26 delivers water in the direction of an arrow 62, receiving the water from an aquarium, which latter could be located at a great distance from the pump 20, such as even two or three rooms away from the pump if desired, since the hose 26 can be of any length.

Such an aquarium is shown diagrammatically at 70 in FIG. 4, although it will be seen that only one wall 72 thereof is shown, and the other end 74 of the hose 26 can be seen in FIG. 4, disposed beneath the level of the water 78 in the tank.

.Water flowing through the hose 26 from the aquarium is delivered into the flow area 60 and then it is drawn downwardly in the direction of the arrows and through an annular space 88, which latter is disposed between the outer side of the wall 50 at the lower terminal end 90 of the wall 50, and the annular surface of the inner wall 96 of the housing 24.

The annular surface 94 is disposed above the terminal end 90 of the chamber housing 50 and the inner wall 96 of the outer housing 24 is of a greater diameter in horizontal cross-section at the upper end of the flow area 60, and still greater at its center than it is at the annular surface 94 and the inner wall 96 tapers inwardly gradually, as seen at 104, as the constricted annular surface 94 is approached from the top and, as seen at 106, the inner wall 96 gradually tapers outwardly to ever larger diameter as the lower end of the outer housing 24 is approached, as would be in horizontaly cross section downwardly from the constricted annular surface 94.

A flow divider 130 extends upwardly into the annular lower end 90 of the inflow chamber 30.

The flow divider 130 is substantially conical shape, having a pointed upper end and becoming larger in horizontal cross section toward its lower end.

The flow divider 130 is maintained centrally along a vertical axis 140 by means of a support structure 142 connected to the lower end of the flow divider 130 and connected to the inner side of the inner wall 96, and the support structure 142 is open for the most part to permit flow of water downwardly there across in the direction of the arrow 148 for flow out the bottom of the flow area 60, which is open during withdrawal of water from an aquarium, such opening being seen at 170, although this opening 170 can also be capped by a cap 180 when it is desired to fill the aquarium from water coming into the pump 20 from a faucet.

The cap 180 is removably secured by threads 182 so as to block flow through the opening 170 when the cap 180 is in place, and this has the effect that water will then flow outwardly through the hose 26 for filling the aquarium 70 of FIG. 4.

The support structure 142 is best seen in FIG. 2, and can be equidistantly spaced support legs 192.

Referring to FIG. 4 a suction squeegee of this invention is generally indicated at 200, and has a hollow handle 210 stiff enough for good control, while using the squeegee blade 220 to clean an inner wall of an aquarium such as the inner side of the wall 72, seen in FIG. 4.

The blade 220 has a surface 228 which generally faces a handle 210, the surface 228 being disposed at an acute angle of approximately 55 degrees with respect to the elongation of the straight handle 210, such angle being seen at 230, whereby the squeegee is effective in loosening algae from the aquarium wall, since the blade 220 is of rubber or of soft plastic with a substantial flexibility and resiliency.

Algae are then drawn with water through an elongated inlet 250 so as to flow upwardly in the direction of the arrow 254 through the hollow handle 200 and from thence through a hose such as the hose 26 which is suitably secured to the upper end of the handle 210 so that the algae are delivered back through the hose 26 and through the pump 20 down into a sink, not shown, below the pump 20.

The handle 210 is connected to an outwardly flared housing 290, as best seen in FIG. 5, so that the blade 220 and the inlet 250 can be of substantially the same length and of much larger transverse dimension than the handle 210 as measured transversely to an axis 270 extending through the handle 210 and at a right angle to the blade 220.

Referring to FIG. 6, an aquarium bottle cleaning tool is there generally shown at 400 and comprising an outer housing 410, having an open lower end 412, whereby the open lower end 412 can be placed onto rocks, shown in dotted lines at 414, at the bottom of an aquarium.

The lower edges 420 of the housing 410 are preferably in a horizontal plane and algae and manure on the rocks 14 can be stirred up by a stirring rod 422, which extends downwardly through a closed top of the housing 410 until the lower end of the rod 422 can be seen at 424 to be in a position for stirring the rocks 414.

The rod 422 extends through an opening 438 in a flexible rubber grommet 440 which connects the rod 422 with the upper wall 442 of the housing 410.

The grommet effectively seals the space between the upper wall 442 at an opening 448 therein and the outer surface of the rod 422.

Figure 8:
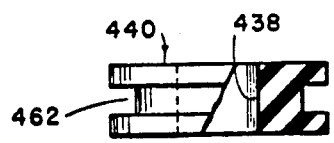
FIG. 8 is a detail showing the grommet of FIG. 6 in frontal elevation with a portion thereof broken away.

The grommet 440 can be best seen in FIG. 8 to be of annular shape, having a central opening 438 for receiving the rod 422, the grommet having an annular notch 462 in the outer edge thereof for receiving edge portions of the upper wall 442 of the housing 410.

In operation, the lower end 423 of the rod 422 will effectively stir the rocks for raising debris into the water inside the housing 410 which is then drawn away through the hose 26.

A hose-receiving tube 470 is disposed partially on the inside of the housing 410 and partially on the outside thereof by extending through an opening 472 in the housing and suitable sealing means 474 is placed between the tube 470 and the wall 476 of the housing.

The hose-receiving tube 470 can be short or long but is designed to be of a size to receive the hose 26 there-over so that the aquarium end of the hose pulls water from the interior of the housing 410 through the tube 470.

The housing wall 476 takes on a special shape as seen at 482, in order to hold the tube 470.

In operation, the housing 410 is placed against the rocks 414 which are stirred by the stirring rod 422, the upper end of which is held in the operator's hands as the housing 410 is pressed against the bottom rocks 414 of the aquarium. Debris-laden water in the housing 410 is drawn through the tube 470 and the hose 26 into the pump of FIG. 1.

In FIG. 3 a flow divider is thereshown at 500 which can be slipped over a faucet and which can divide flow for delivering filling water to two aquariums at once. It is not necessarily used in conjunction with the other devices described herein.

Some fish die if their water is under 70 degrees. Fish tank heaters are very slow. The faucet F is a mixing faucet of the common kind capable of receiving both hot and cold water from water line connections hot and cold, not shown, and capable of being adjusted so as to adjust the temperature of water passing into the pump to ideal temperature for fish to avoid long delay in heating water before putting fish from a temporary pan into the tank or aquarium 70.

I claim:

1. An aquarium pump and cleaning system comprising a pump having a housing having an outlet port delivering water to a water drain, said pump housing having an inlet opening, said pump pulling water through its inlet opening, a hose having one end connected to said inlet opening, an aquarium, a tubular means having one end connected to the other end of said hose and having its other end in said aquarium, said pump housing having an inlet port, said pump being a venturi pump attachable at said inlet port to a source of water pressure and utilizing said water pressure to draw water through said inlet opening, said pump having an outer housing, an inner chamber wall inside said housing and spaced from said outer housing, said inner chamber wall having an inner surface which tapers gradually to provide a larger upper chamber portion tapering to a smaller lower chamber portion which latter has a terminal section, said lowermost end of said terminal section being open, a flow divider fixed to said housing and having a smaller upper end disposed adjacent the center of said open lower end of said terminal section, said flow divider having an outer surface tapering from a said smaller upper end to a larger lower end, said housing having an inner wall spaced from the outer side of said chamber wall and having a constricted portion adjacent the open lower end of said chamber wall and larger portions above and below said constricted portion, said flow divider being spaced from the inner wall of said housing, and having in combination a sink faucet, means attached on said sink faucet and delivering water from said faucet to said pump, and having said terminal section of said inner chamber wall being outwardly flared so as to be larger at its lowermost end than at its upper end, said upper and lower chamber portions being substantially free of interference from any flow divider support means.

2. An aquarium pump and cleaning system comprising a pump having a housing having an outlet port delivering water to a water drain, said pump housing having an inlet opening, said pump pulling water through its inlet opening, a hose having one end connected to said inlet opening, an aquarium, a tubular means having one end connected to the other end of said hose and having its other end in said aquarium, said pump housing having an inlet port, said pump being a venturi pump attachable at said inlet port to a source of water pressure and utilizing said water pressure to draw water through said inlet opening, said pump having an outer housing, an inner chamber wall inside said housing and spaced from said outer housing, said inner chamber wall having an inner surface which tapers gradually to provide a larger upper chamber portion tapering to a smaller lower chamber portion which latter has a terminal section, said lowermost end of said terminal section being open, a flow divider fixed to said housing and having a smaller upper end disposed adjacent the center of said open lower end of said terminal section, said flow divider having an outer surface tapering from a said smaller upper end to a larger lower end, said housing having an inner wall spaced from the outer side of said chamber wall and having a constricted portion adjacent the open lower end of said chamber wall and larger portions above and below said constricted portion, said flow divider being spaced from the inner wall of said housing, said terminal section of said inner chamber wall being outwardly flared so as to be larger at its lowermost end than at its upper end, said (inner chamber) upper and lower chamber portions being substantially free of interference from any flow divider support means.

* * * * *